Oct. 2, 1923.
J. ALSFASSER
1,469,375
PRESSED METAL FASTENING BRACKET FOR PIPE DAMPER REGULATORS
Filed Feb. 2, 1923
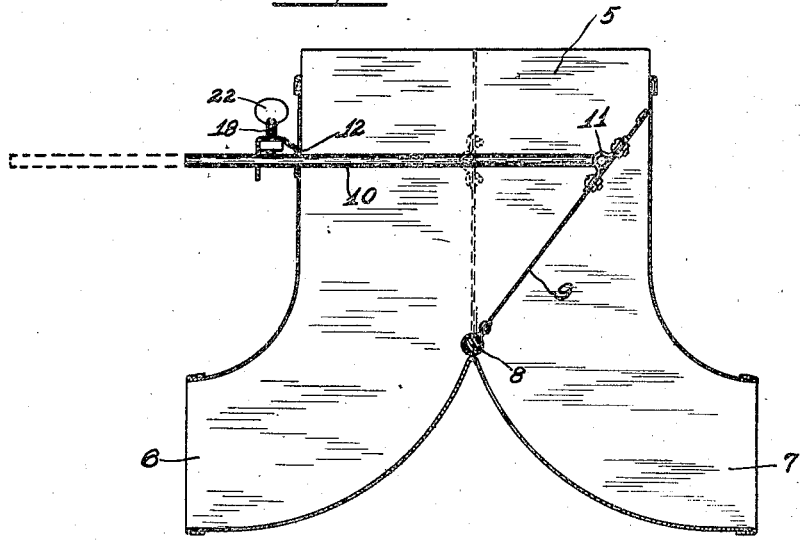
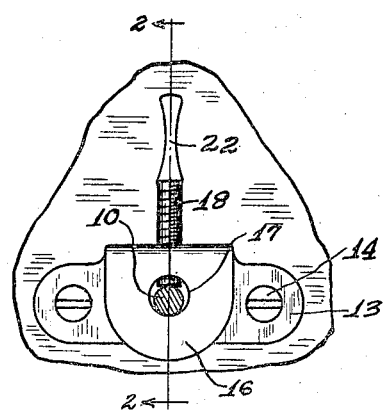
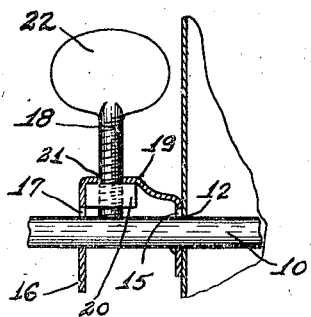
Inventor
Joseph Alsfasser Patented Oct. 2, 1923.

1,469,375

UNITED STATES PATENT OFFICE.

JOSEPH ALSFASSER, OF CHICAGO, ILLINOIS.

PRESSED-METAL FASTENING BRACKET FOR PIPE-DAMPER REGULATORS.

Application filed February 2, 1923. Serial No. 616,466.

*To all whom it may concern:*

Be it known that I, JOSEPH ALSFASSER, a citizen of the United States, residing in Chicago, in the county of Cook and State of Illinois, have invented certain new and useful Improvements in Pressed-Metal Fastening Brackets for Pipe-Damper Regulators, of which the following is a specification.

My invention relates to damper controls for air ventilating and heating ducts and the like and has special reference to a pressed metal bracket for association with damper regulators for such ducts.

An object of my invention is to provide an efficient, cheap and strong bracket for pipe damper controls.

Another object of my invention is to provide a bracket for pipe damper regulators which is formed of wrought metal and which has a portion with which co-operates means for securing the damper in adjusted position by a member connected to the damper and disposed adjacent the bracket.

A further object of the invention is to provide a pressed metal damper control bracket for pipe dampers and the like.

Generally speaking, I carry out the preferred embodiment of my invention by forming a bracket of pressed metal into substantially U shape, inverting the same as to position on the pipe in such manner that the rod or the like attached to the damper for moving the same may pass through the bracket for clamping purposes.

The above recited and other objects of the invention will be apparent from the following description and drawings and will be particularly pointed out in the appended claim.

In ventilating and air heating systems, it is customary to interpose at suitable intervals dampers for regulating the passage of air or heat through the pipes or ducts. It is usual to vary the position of the dampers by rods or the like passing through and partially in the side of the pipe, and providing a clamp for securing the rods in adjusted position for the purpose of proper damper regulation. It has been the practice to make the brackets of cast metal but experience has shown that these break easily necessitating frequent replacement. I have overcome this objection by forming the bracket of wrought metal and shaping it in such manner that a screw clamp may be employed for holding the damper rod in adjusted position.

In the accompanying drawings:

Figure 1 is a vertical sectional view of the preferred embodiment of the invention shown as applied to a branch pipe connection;

Figure 2 is an enlarged sectional view of the bracket and the co-operating clamping parts; and Figure 3 is an end view of the bracket shown in Figure 2.

In the drawings, I have shown in Figure 1 a branch pipe connection substantially Y shaped in section and inverted as to position, the branches being indicated at 5, 6 and 7. Pivoted by means of a suitable rod 8 secured in the sides of the pipe is a damper 9. The damper is shown as a vane substantially rectangular in elevation and is adapted to be swung about the pivot 8 for varying the openings through the branch. The rod 10 is fastened by means of a suitable bracket 11 to the damper or vane 9 and disposed to pass through an opening 12 in the side of the pipe. Attached to the outside of the pipe is the bracket of my invention.

The bracket is formed in the present instance of sheet metal pressed into substantially U shape and inverted as to position. That portion of the bracket which is adapted to be secured to the pipe has laterally extended ears 13 which are apertured for the reception of screws, bolts or other fastening means 14 which pass through registering apertures in the pipe. This portion is also provided with an enlarged centrally disposed opening 15 through which the rod 10 passes. The other leg 16 of the bracket has a similarly disposed and registering opening 17 therein through which the rod 10 passes.

In order to eliminate the formation of screw threads in the bracket, I provide means for permitting the use of a threaded screw 18 in the following manner: Extending crosswise of the central portion of the bracket that is parallel to the side 16 is a shoulder 19. Against the under side of the central portion of the bracket is employed a nut 20, preferably a square nut, disposed so that one of its edges will engage the shoulder 19 and receive the threaded portion of the screw 18. The central portion of the bracket is provided with a suitably disposed aperture 21 through which the screw 18 passes. The screw 18 is provided with an enlarged head 22 for purposes well understood.

The operation of the device is as follows:

The rod 10 is of sufficient length to pass through both side members of the bracket irrespective of the position of the damper or vane. The rod is clamped in adjusted position by turning the screw 18 so that the end thereof will bear against the rod. The clamping effect is caused by the screw 18 bearing against the rod 10 between the apertures 15 and 17 of the side members of the bracket, and the screw is maintained in position by reason of its co-operation with the nut 20 which is prevented from turning by engagement of the nut with the shoulder 19 clamped in the bracket. After moving the vane the screw may be loosened and the rod moved inwardly or outwardly as desired and secured in adjusted position by tightening the screw 18 thereagainst.

I do not wish to limit the application of my invention to a construction such as that shown in the drawings, as it is applicable to any kind or shape of pipe when used in connection with a damper regulator of the type shown.

While I have described more or less precisely the details of construction of my invention, I do not wish to be understood as limiting myself thereto, as I contemplate changes in form and the proportion of parts and the substitution of equivalents as circumstances may suggest or render expedient, without departing from the spirit of my invention.

I claim:—

In a device of the class described, a bracket formed of sheet metal and bent into substantially U shape and inverted as to position and secured to a pipe, a damper rod passing through registering openings in said pipe and said bracket, a portion of said bracket between the side members thereof being provided with a shoulder transversely thereof and disposed beyond the openings therein, said bracket having another opening in the base of the U portion, a threaded member passing through said last named opening and adapted to engage said rod, and a nut disposed between said rod and the base of said bracket against said shoulder to prevent turning of said nut whereby said threaded member may be actuated for clamping said rod in selected position in said bracket.

Signed at Chicago, Illinois, this 29th day of January, 1923.

JOSEPH ALSFASSER.